US012803171B2

(12) United States Patent
Li et al.

(10) Patent No.: US 12,803,171 B2
(45) Date of Patent: Nov. 17, 2026

(54) PLANAR TRANSPARENT ANTENNA STRUCTURE

(71) Applicant: INDUSTRIAL TECHNOLOGY RESEARCH INSTITUTE, Hsinchu (TW)

(72) Inventors: Bing-Syun Li, Hsinchu City (TW); Li-Yang Tsai, Luodong Township (TW); Kuang-Hui Shih, Tainan City (TW); Ruo-Lan Chang, New Taipei City (TW); Wei-Chung Chen, Zhunan Township (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 52 days.

(21) Appl. No.: 18/624,623

(22) Filed: Apr. 2, 2024

(65) Prior Publication Data

US 2024/0339756 A1 Oct. 10, 2024

Related U.S. Application Data

(60) Provisional application No. 63/457,425, filed on Apr. 6, 2023.

(30) Foreign Application Priority Data

Jan. 24, 2024 (TW) ................................ 113102790

(51) Int. Cl.
*H01Q 9/04* (2006.01)
*H01Q 19/00* (2006.01)

(52) U.S. Cl.
CPC ......... *H01Q 9/0464* (2013.01); *H01Q 19/005* (2013.01)

(58) Field of Classification Search
CPC ...... H01Q 5/378; H01Q 5/385; H01Q 9/0457; H01Q 9/0464; H01Q 19/005
See application file for complete search history.

(56) References Cited

U.S. PATENT DOCUMENTS 11,145,983 B1 10/2021 Tarng et al.
2005/0052322 A1 3/2005 Park et al.
(Continued)

FOREIGN PATENT DOCUMENTS

CN 112531338 A 3/2021
CN 113851851 A 12/2021
(Continued)

OTHER PUBLICATIONS

C.K. Aanandan, P. Mohanan, K.G. Nair, Broad-Band Gap Coupled Microstrip Antenna, Oct. 10, 1990, IEEE (Year: 1990).*
(Continued)

*Primary Examiner* — Raymond R Chai
(74) *Attorney, Agent, or Firm* — Birch, Stewart, Kolasch & Birch, LLP

(57) ABSTRACT

A planar transparent antenna structure is provided. The planar transparent antenna structure includes a dielectric substrate, a radiation patch conductive layer, a parasitic patch conductive layer and a ground conductive layer. The radiation patch conductive layer is disposed on the dielectric substrate. The radiation patch conductive layer is a ring structure. The parasitic patch conductive layer is disposed on the dielectric substrate. The ground conductive layer is disposed on the dielectric substrate. The radiation patch conductive layer, the parasitic patch conductive layer and the ground conductive layer are composed of a plurality of wires interconnected and connected with each other and are light-transmissive.

11 Claims, 20 Drawing Sheets

(56) References Cited

U.S. PATENT DOCUMENTS

| | | | | |
|---|---|---|---|---|
| 2005/0280592 | A1* | 12/2005 | Yegin | H01Q 9/0407 343/834 |
| 2013/0169503 | A1* | 7/2013 | Fakharzadeh Jahromi | H01Q 19/005 343/833 |
| 2015/0029064 | A1 | 1/2015 | Pan et al. | |
| 2016/0093939 | A1 | 3/2016 | Kim et al. | |
| 2019/0165476 | A1* | 5/2019 | Hong | H01Q 21/065 |
| 2023/0094901 | A1* | 3/2023 | Mitsugi | H01Q 9/065 343/795 |
| 2023/0099250 | A1* | 3/2023 | Tang | H01Q 1/38 343/848 |
| 2025/0226592 | A1* | 7/2025 | Qi | H01Q 1/38 |

FOREIGN PATENT DOCUMENTS

| | | | |
|---|---|---|---|
| CN | 114883809 | A | 8/2022 |
| TW | 516253 | B | 1/2003 |
| TW | 200525816 | A | 8/2005 |
| TW | I492453 | B | 7/2015 |
| TW | 202118251 | A | 5/2021 |
| TW | 202215709 | A | 4/2022 |
| TW | 202245330 | A | 11/2022 |
| TW | 202301743 | A | 1/2023 |

OTHER PUBLICATIONS

Taiwanese Office Action and Search Report for Taiwanese Application No. 113102790, dated Mar. 4, 2025.

Extended European Search Report for European Application No. 24167023.1, dated Sep. 30, 2024.

* cited by examiner

PLANAR TRANSPARENT ANTENNA STRUCTURE

This application claims the benefit of U.S. Provisional application Ser. No. 63/457,425, filed Apr. 6, 2023, and Taiwan application Serial No. 113102790, filed Jan. 24, 2024, the disclosure of which are incorporated by reference herein in its entirety.

TECHNICAL FIELD

The disclosure relates to a planar transparent antenna structure.

BACKGROUND

The current traditional antennas are not light-transparent and will appear quite awkward when applied to windows or car windows. If a transparent conductive layer is used to make the antenna, it will affect the radiation efficiency. How to make a planar transparent antenna structure with high transparency and good radiation is a development direction for the industry.

SUMMARY

The disclosure is directed to a planar transparent antenna structure, which forms a conductive layer through mesh-like wires, adds a parasitic patch conductive layer, and designs the radiation patch conductive layer into a ring structure, so that the planar transparent antenna structure could have a certain degree of transmittance and good radiation efficiency.

According to one embodiment, a planar transparent antenna structure is provided. The planar transparent antenna structure includes a dielectric substrate, a radiation patch conductive layer, a parasitic patch conductive layer and a ground conductive layer. The radiation patch conductive layer is disposed on the dielectric substrate. The radiation patch conductive layer is a ring structure. The parasitic patch conductive layer is disposed on the dielectric substrate. The ground conductive layer is disposed on the dielectric substrate. The radiation patch conductive layer, the parasitic patch conductive layer and the ground conductive layer are composed of a plurality of wires interlaced and connected with each other and are light-transmissive.

According to another embodiment, a planar transparent antenna structure is provided. The planar transparent antenna structure includes a dielectric substrate, a radiation patch conductive layer, a parasitic patch conductive layer and a ground conductive layer. The radiation patch conductive layer is disposed on the dielectric substrate. The radiation patch conductive layer has a slot and a metal body, and the slot is 0.3 times or more of the metal body. The parasitic patch conductive layer is disposed on the dielectric substrate. The ground conductive layer is disposed on the dielectric substrate. The radiation patch conductive layer, the parasitic patch conductive layer and the ground conductive layer are composed of a plurality of wires interlaced and connected with each other and are light-transmissive.

According to an alternative embodiment, a planar transparent antenna structure is provided. The planar transparent antenna structure includes a dielectric substrate, a radiation patch conductive layer, a parasitic patch conductive layer and a ground conductive layer. The radiation patch conductive layer is disposed on the dielectric substrate. The radiation patch conductive layer is a ring structure. The parasitic patch conductive layer is disposed on the dielectric substrate. The ground conductive layer is disposed on the dielectric substrate. The radiation patch conductive layer, the parasitic patch conductive layer and the ground conductive layer have a plurality of holes and are light-transmissive. The holes are arranged in an array.

Figure 1A:
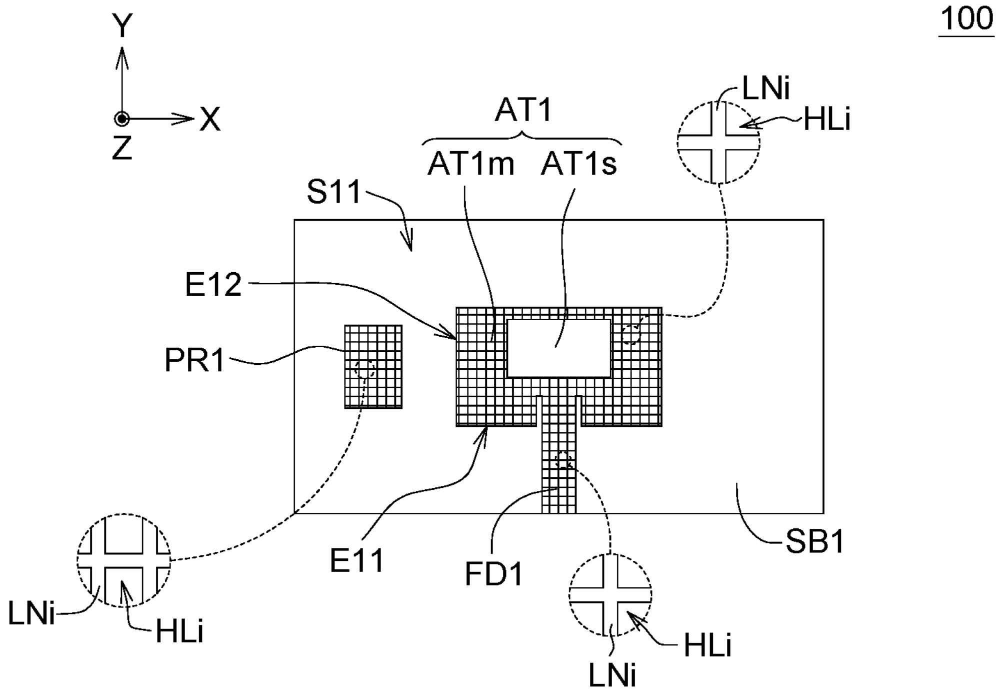
FIG. 1A illustrates a top view of a planar transparent antenna structure according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
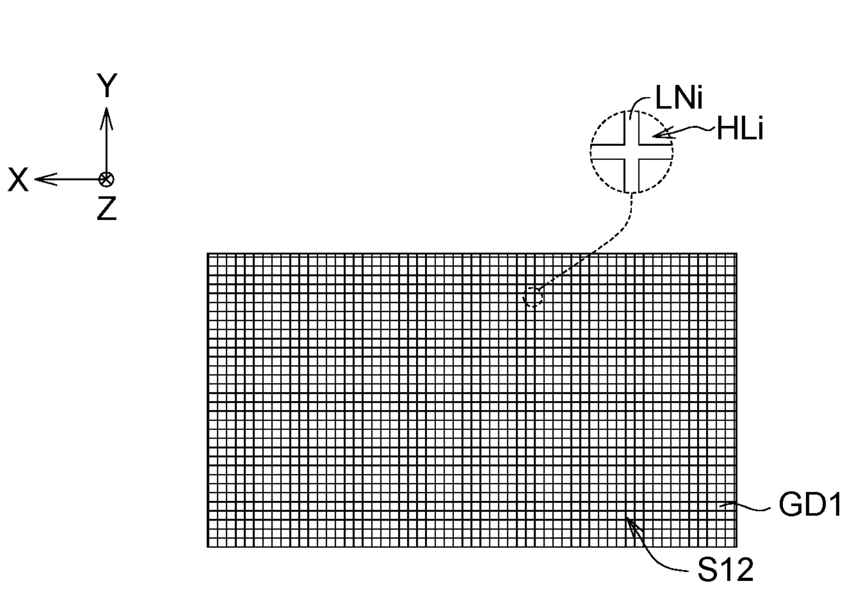
FIG. 1B illustrates a rear view of the planar transparent antenna structure according to an embodiment of the disclosure.
Figure 1C:
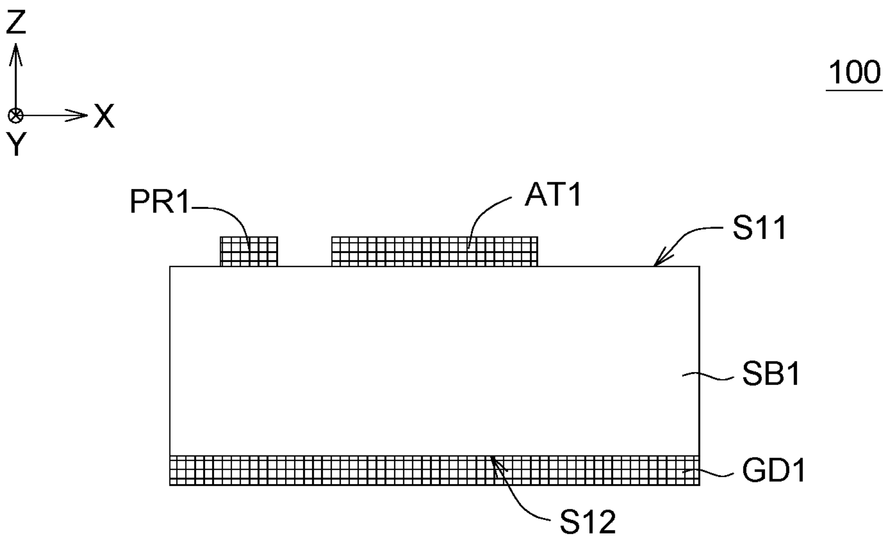
FIG. 1C illustrates a side view of the planar transparent antenna structure according to an embodiment of the present disclosure.

Please refer to FIGS. 1A to 1C. FIG. 1A illustrates a top view of a planar transparent antenna structure 100 according to an embodiment of the disclosure. FIG. 1B illustrates a rear view of the planar transparent antenna structure 100 according to an embodiment of the disclosure. FIG. 1C illustrates a side view of the planar transparent antenna structure 100 according to an embodiment of the present disclosure. The planar transparent antenna structure 100 includes a dielectric substrate SB1, a radiation patch conductive layer AT1, a parasitic patch conductive layer PR1, a ground conductive layer GD1 and a feeder FD1. The material of the dielectric substrate SB1 is a transparent insulating material, such as transparent glass plate or transparent acrylic plate.

As shown in FIGS. 1A and 1C, the radiation patch conductive layer AT1 is disposed on a first surfaces S11 of the dielectric substrate SB1. The radiation patch conductive layer AT1 is a ring structure. The radiation patch conductive layer AT1 has a slot AT1*s* and a metal body AT1*m*. The area of the slot AT1*s* is more than 0.3 times the area of metal body AT1*m*. The shape of slot AT1*s* could be rectangular, circular, triangular or trapezoidal. The material of the radiation patch conductive layer AT1 is a conductive material, such as metal or carbon.

As shown in FIGS. 1A and 1C, the parasitic patch conductive layer PR1 is also disposed on the first surface S11 of dielectric substrate SB1. The parasitic patch conductive layer PR1 is completely isolated from the radiation patch conductive layer AT1 without being connected. The material of parasitic patch conductive layer PR1 is conductive material, such as metal or carbon. The material of the parasitic patch conductive layer PR1 may be the same as or different from the material of the radiation patch conductive layer AT1. In this embodiment, the parasitic patch conductive layer PR1 and the radiation patch conductive layer AT1 may use the same material.

As shown in FIG. 1A, the parasitic patch conductive layer PR1 is, for example, a rectangular structure, a circular structure or a trapezoidal structure. The parasitic patch conductive layer PR1 is disposed at outside of the side E12 of the radiation patch conductive layer AT1.

As shown in FIGS. 1B and 1C, the ground conductive layer GD1 is disposed on a second surface S12 of the dielectric substrate SB1. The first surface S11 and the second surface S12 of the dielectric substrate SB1 are two opposite surfaces.

As shown in FIGS. 1A and 1B, the radiation patch conductive layer AT1, the parasitic patch conductive layer PR1 and the ground conductive layer GD1 are composed of a plurality of wires LNi interleaved and connected with each other, so that the radiation patch conductive layer AT1, the parasitic patch conductive layer PR1 and the ground conductive layer GD1 have high transmittance. When the planar transparent antenna structure 100 is used to the glass windows or the car windows, it could significantly reduce visual occlusion without affecting the field of view or creating obtrusive situations.

As shown in FIGS. 1A and 1B, the ring structure radiation patch conductive layer AT1, the parasitic patch conductive layer PR1 and the ground conductive layer GD1 have a plurality of holes HLi, which are arranged in an array. The holes HLi are not limited to squares, and could also be rectangles, circles, triangles, hexagons, or any other shapes.

As shown in FIGS. 1A and 1C, the planar transparent antenna structure 100 further includes a feeder FD1. The feeder FD1 is composed of the wires LNi interleaved and connected with each other. The feeder FD1 is disposed at the outside of a side E11 adjacent to the radiation patch conductive layer AT1, and connected to the radiation patch conductive layer AT1.

Figure 2A:
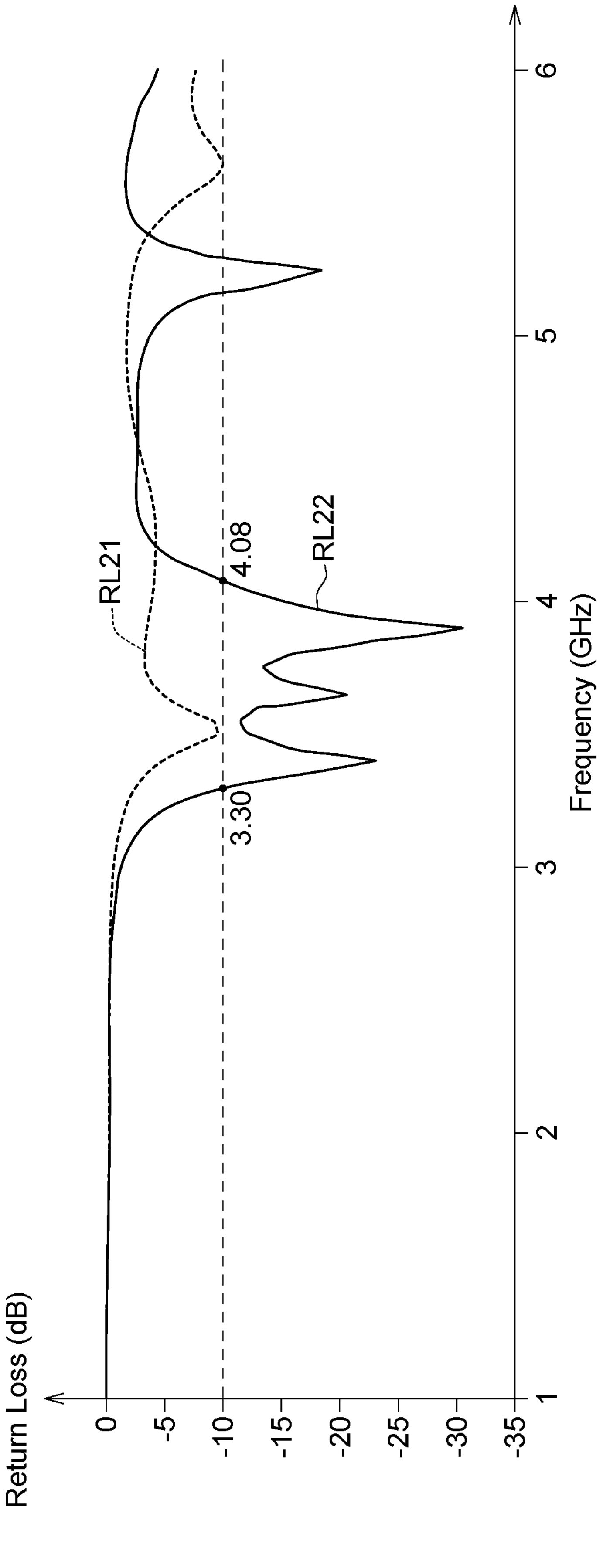
FIG. 2A illustrates a return loss curve of a planar transparent antenna structure without the parasitic patch conductive layer and a return loss curve of a planar transparent antenna structure with the parasitic patch conductive layer.

Please refer to FIG. 2A, which illustrates a return loss curve RL21 of a planar transparent antenna structure without the parasitic patch conductive layer PR1 and a return loss curve RL22 of a planar transparent antenna structure with the parasitic patch conductive layer PR1. In FIG. 2A, the horizontal axis is the frequency and the vertical axis is the return loss. As shown in the return loss curve RL21, the planar transparent antenna structure without the parasitic patch conductive layer PR1 radiates at a frequency of 3.5 GHz. As shown in the return loss curve RL22, the parasitic patch conductive layer PR1 helps to oscillate the frequency band around 3.9 G, so that n78 (3.3 G to 3.8 G) could be realized. Obviously, the planar transparent antenna structure with the parasitic patch conductive layer PR1 could obtain a wider bandwidth.

Figure 2B:
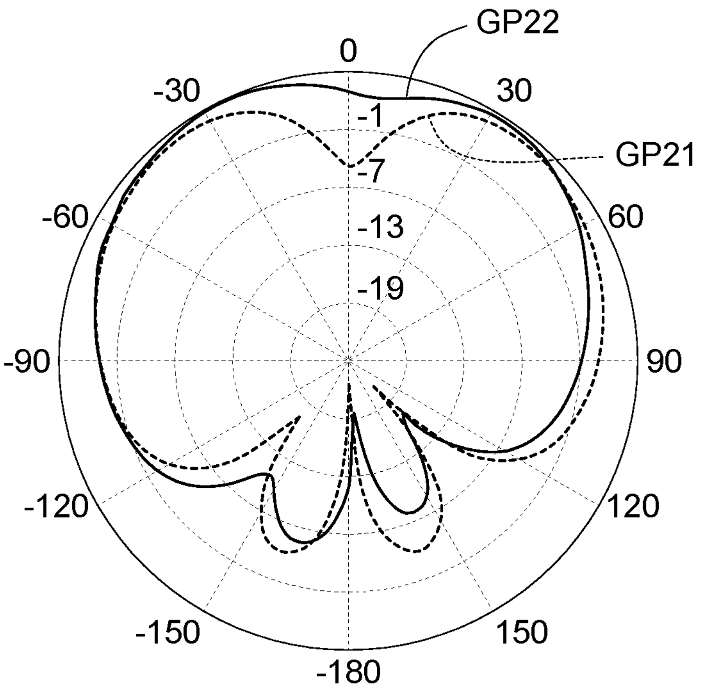
FIG. 2B illustrates a radiation field of a planar transparent antenna structure without the parasitic patch conductive layer and a radiation field of a planar transparent antenna structure with the parasitic patch conductive layer.

Please refer to FIG. 2B, which illustrates a radiation field GP21 of the planar transparent antenna structure without the parasitic patch conductive layer PR1 and a radiation field GP22 of the planar transparent antenna structure with the parasitic patch conductive layer PR1. As shown in the radiation field GP21 and the radiation field GP22, there is not much difference in the radiation field of the planar transparent antenna structure with parasitic patch conductive layer PR1 and the radiation field of the planar transparent antenna structure without the parasitic patch conductive layer PR1. That is to say, the radiation field is not affected.

In other words, the bandwidth of the planar transparent antenna structure with the parasitic patch conductive layer PR1 could be significantly increased, but the radiation field of the planar transparent antenna structure would not be changed or affected.

Figure 3A:
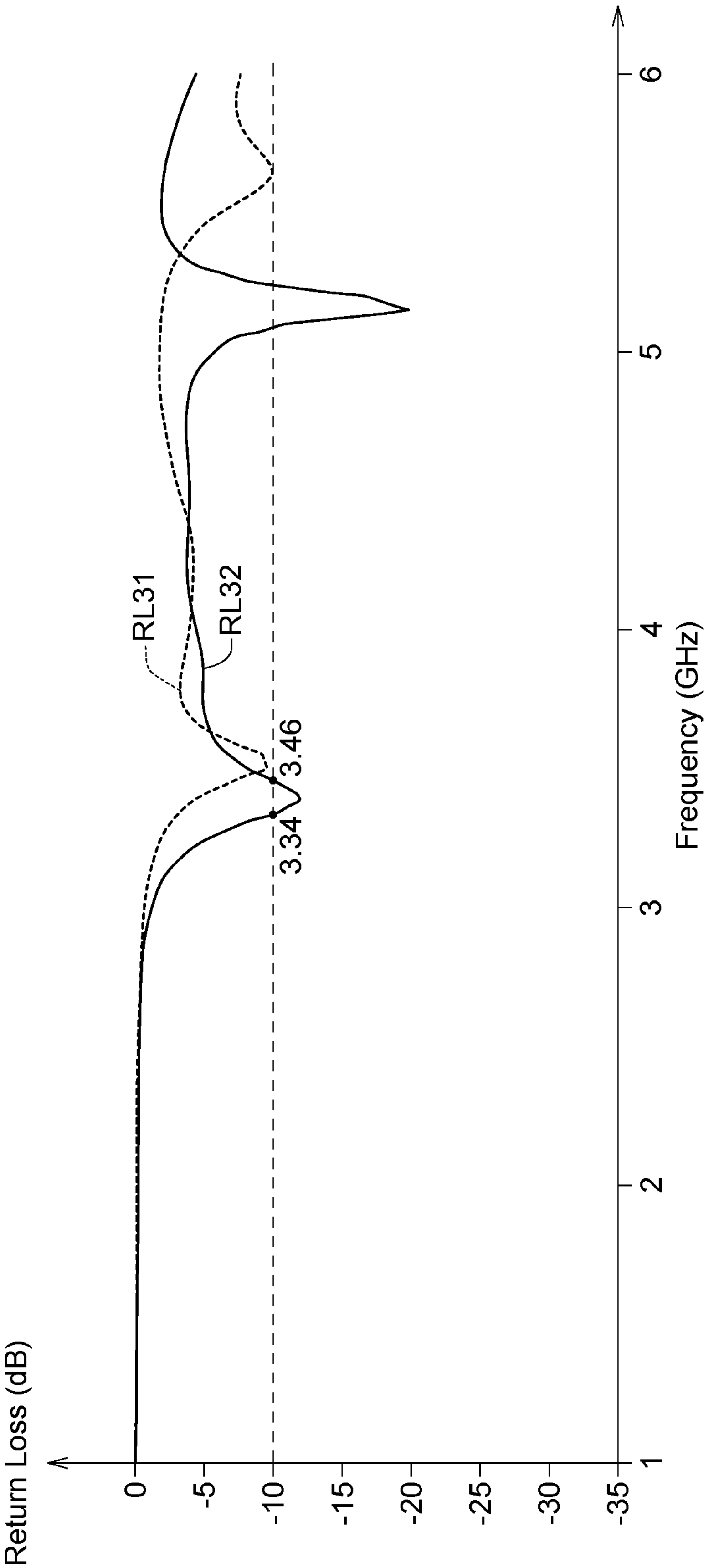
FIG. 3A illustrates a return loss curve of a planar transparent antenna structure with the radiation patch conductive layer which is a non-ring structure and a return loss curve of a planar transparent antenna structure with the radiation patch conductive layer which is a ring structure.

Please refer to FIG. 3A, which illustrates a return loss curve RL31 of a planar transparent antenna structure with the radiation patch conductive layer which is a non-ring structure and a return loss curve RL32 of a planar transparent antenna structure with the radiation patch conductive layer which is a ring structure. In FIG. 3A, the horizontal axis is the frequency and the vertical axis is the return loss. As shown in the return loss curve RL31, the planar transparent antenna structure with the radiation patch conductive layer having the non-ring structure radiates at a frequency of 3.5 GHz. As shown in the return loss curve RL32, the parasitic patch conductive layer PR1 helps to oscillate the frequency of 3.34 GHz to 3.46 GHz, in case of that the radiation patch conductive layer has the ring structure. Obviously, the planar transparent antenna structure with the radiation patch conductive layer with the ring structure could obtain a wider bandwidth.

Figure 3B:
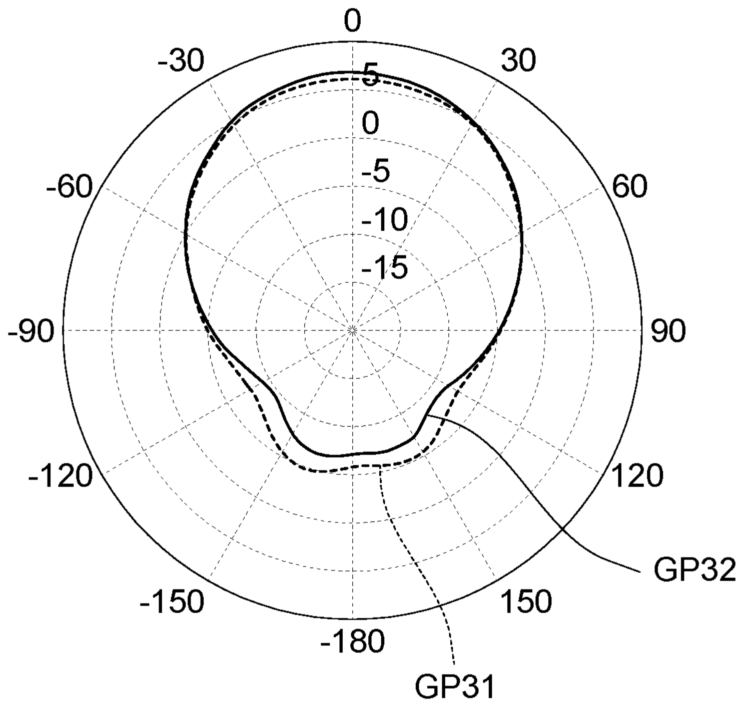
FIG. 3B, which illustrates a radiation field of a planar transparent antenna structure with the radiation patch conductive layer having the non-ring structure and a radiation field of a planar transparent antenna structure with the radiation patch conductive layer having a ring structure.

Please refer to FIG. 3B, which illustrates a radiation field GP31 of the planar transparent antenna structure with the radiation patch conductive layer having the non-ring structure and a radiation field GP32 of the planar transparent antenna structure with the radiation patch conductive layer having the ring structure. As shown in the radiation field GP31 and the radiation field GP32, the radiation field GP31 of the planar transparent antenna structure with the radiation patch conductive layer having the non-ring structure is almost the same as the radiation field GP32 of the planar transparent antenna structure with the radiation patch conductive layer having the ring structure. Therefore, the transparency and the bandwidth of the planar transparent antenna structure with the radiation patch conductive layer having the ring structure could be increased without affecting the radiation field.

Therefore, according to the above embodiments, the parasitic patch conductive layer and the radiation patch conductive layer having the ring structure could not only achieve high transmittance of the planar transparent antenna structure, but also have good radiation efficiency, and could be widely used in vehicles, buildings, monitors.

Figure 4A:
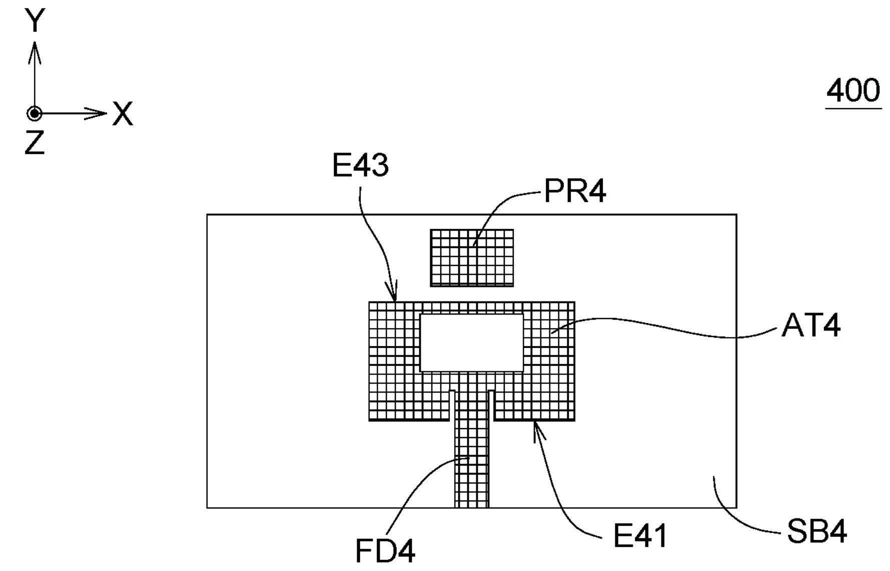
FIG. 4A illustrates a top view of a planar transparent antenna structure according to another embodiment of the present disclosure.
Figure 4B:
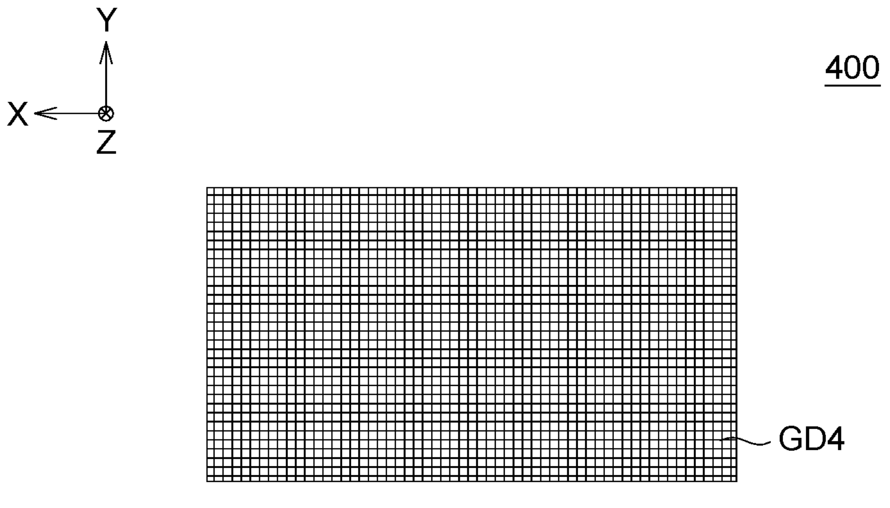
FIG. 4B illustrates a rear view of the planar transparent antenna structure according to another embodiment of the present disclosure.
Figure 4C:
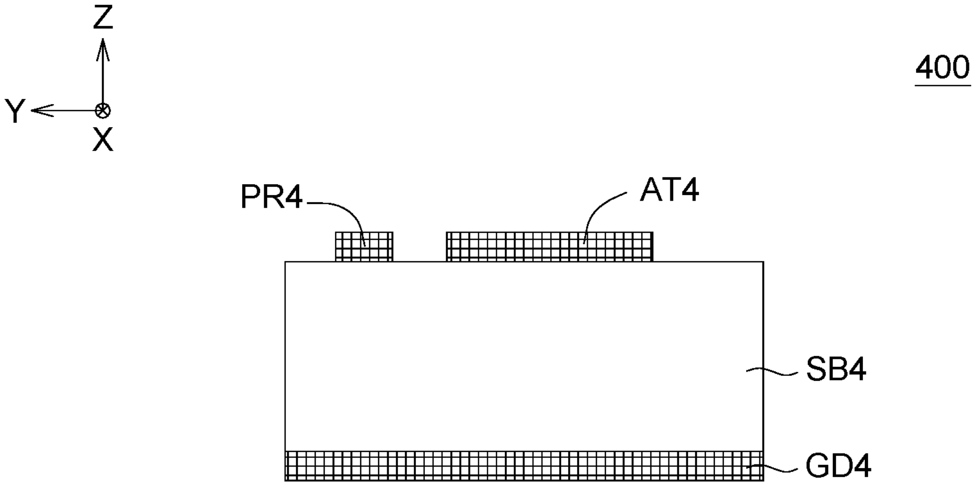
FIG. 4C illustrates a side view of the planar transparent antenna structure according to another embodiment of the present disclosure.

Please refer to FIGS. 4A to 4C. FIG. 4A illustrates a top view of a planar transparent antenna structure 400 according to another embodiment of the present disclosure. FIG. 4B illustrates a rear view of the planar transparent antenna structure 400 according to another embodiment of the present disclosure. FIG. 4C illustrates a side view of the planar transparent antenna structure 400 according to another embodiment of the present disclosure. In one embodiment, the planar transparent antenna structure 400 includes a dielectric substrate SB4, a radiation patch conductive layer AT4, a parasitic patch conductive layer PR4, a ground conductive layer GD4 and a feeder FD4. As shown in FIG. 4A, the edge of the radiation patch conductive layer AT4 is, for example, a rectangle, a triangle, a circle, a trapezoid or a polygon.

As shown in FIG. 4A, the feeder FD4 is disposed at the outside of a side E41 of the radiation patch conductive layer AT4 and is connected to the radiation patch conductive layer AT4. The feeder FD4 could be composed of the wires LNi interleaved and connected with each other.

As shown in FIG. 4A, the parasitic patch conductive layer PR4 is disposed at the outside of another side E43 of the radiation patch conductive layer AT4. The parasitic patch conductive layer PR4 is completely isolated from the radiation patch conductive layer AT4. The feeder FD4 and the parasitic patch conductive layer PR4 are respectively disposed at the opposite sides E41 and E43 of the radiation patch conductive layer AT4. The direction, the shape and the size of the parasitic patch conductive layer PR4 could be adjusted according to the required radiation direction.

Figure 5A:
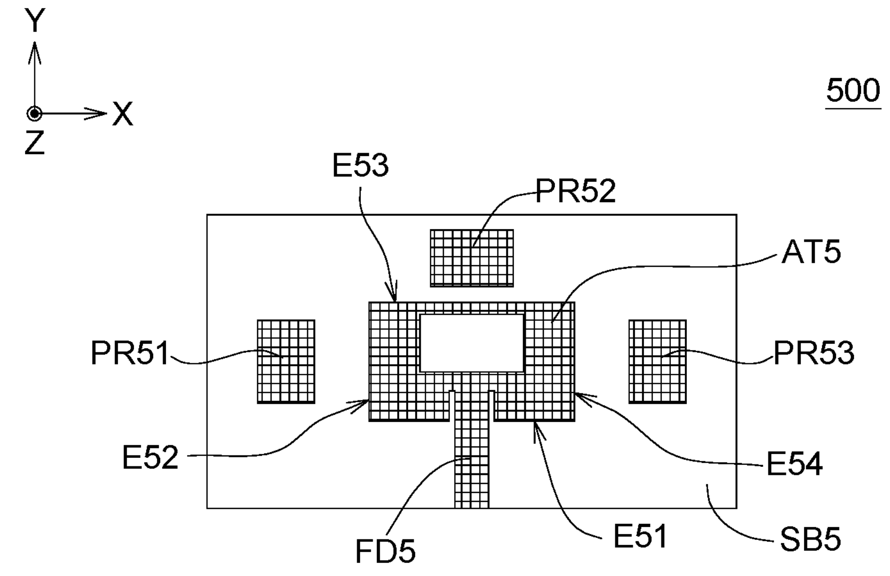
FIG. 5A illustrates a top view of a planar transparent antenna structure according to another embodiment of the present disclosure.
Figure 5B:
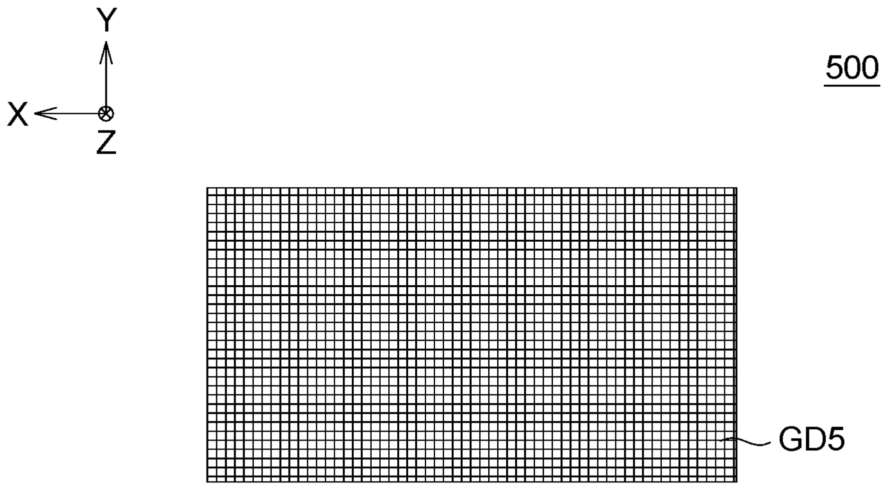
FIG. 5B illustrates a rear view of the planar transparent antenna structure according to another embodiment of the present disclosure.
Figure 5C:
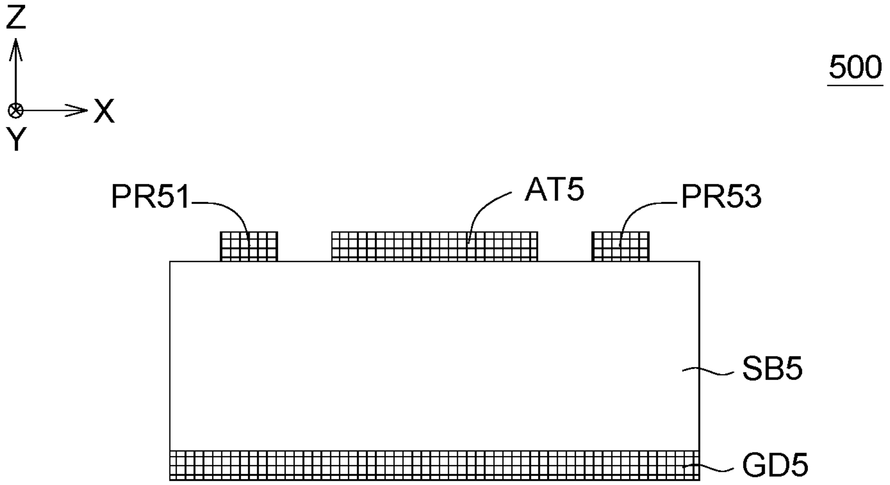
FIG. 5C illustrates a side view of the planar transparent antenna structure according to another embodiment of the present disclosure.

Please refer to FIGS. 5A to 5C. FIG. 5A illustrates a top view of a planar transparent antenna structure 500 according to another embodiment of the present disclosure. FIG. 5B illustrates a rear view of the planar transparent antenna structure 500 according to another embodiment of the present disclosure. FIG. 5C illustrates a side view of the planar transparent antenna structure 500 according to another embodiment of the present disclosure. In one embodiment, the planar transparent antenna structure 500 includes a dielectric substrate SB5, a radiation patch conductive layer AT5, three parasitic patch conductive layers PR51, PR52, PR53, a ground conductive layer GD5 and a feeder FD5.

As shown in FIG. 5A, the edge of the radiation patch conductive layer AT5 is, for example, a rectangle. Or, the edge of the radiation patch conductive layer AT5 could be a triangle, a circle, a trapezoid or a polygon. The feeder FD5 is disposed at the outside of a side E51 of the radiation patch conductive layer AT5 and is connected to the radiation patch conductive layer AT5.

As shown in FIG. 5A, the parasitic patch conductive layers PR51, PR52, and PR53 are composed of the wires LNi interleaved and connected with each other. The parasitic patch conductive layer PR51 is disposed at the outside of a side E52 of radiation patch conductive layer AT5. The parasitic patch conductive layer PR52 is disposed at the outside of a side E53 of radiation patch conductive layer AT5. The parasitic patch conductive layer PR53 is disposed at the outside of a side E54 of the radiation patch conductive layer AT5. The parasitic patch conductive layers PR51, PR52, PR53 and the radiation patch conductive layer AT5 are completely isolated and not connected to each other. The sizes or the quantity of the parasitic patch conductive layers PR51, PR52, PR53 could be adjusted according to the user's need.

Figure 6A:
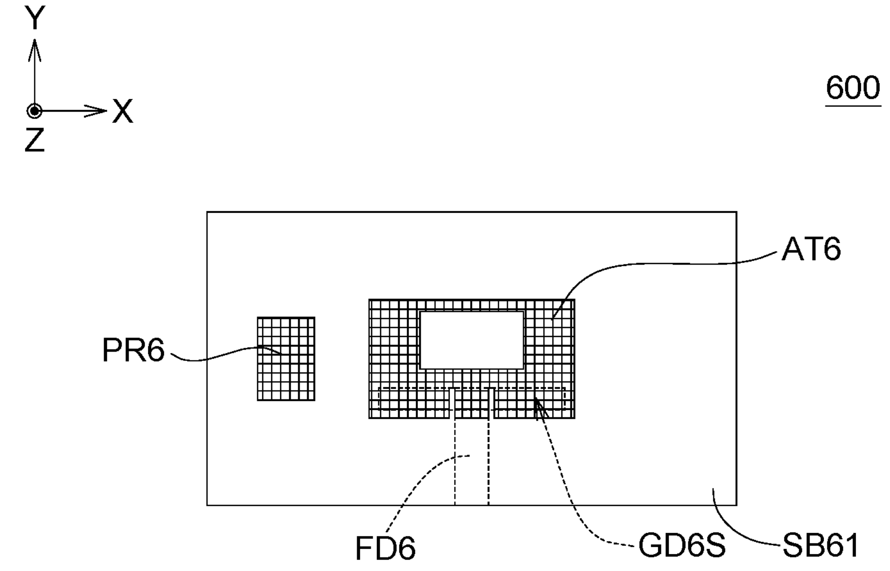
FIG. 6A illustrates a top view of a planar transparent antenna structure according to another embodiment of the disclosure.
Figure 6B:
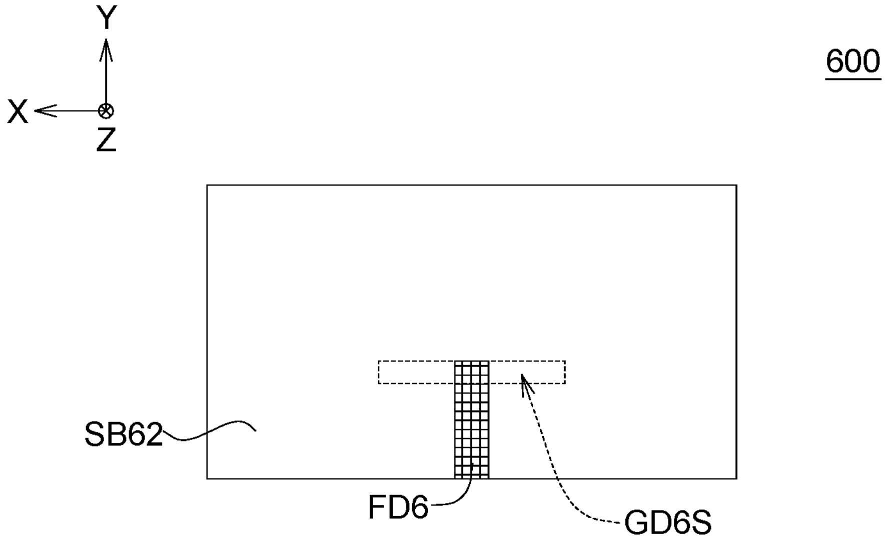
FIG. 6B illustrates a rear view of the planar transparent antenna structure according to another embodiment of the disclosure.
Figure 6C:
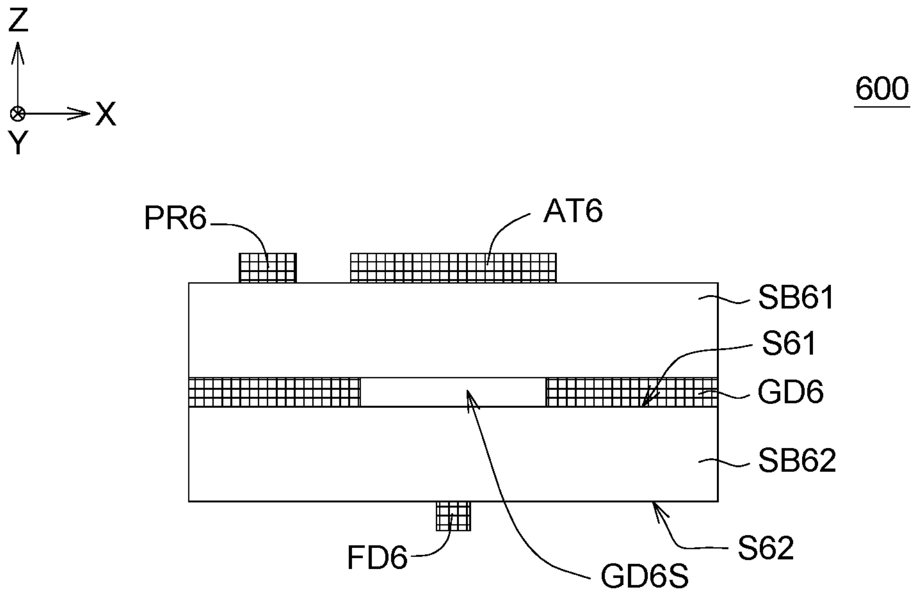
FIG. 6C illustrates a side view of the planar transparent antenna structure according to another embodiment of the present disclosure.

Please refer to FIGS. 6A to 6C. FIG. 6A illustrates a top view of a planar transparent antenna structure 600 according to another embodiment of the disclosure. FIG. 6B illustrates a rear view of the planar transparent antenna structure 600 according to another embodiment of the disclosure. FIG. 6C illustrates a side view of the planar transparent antenna structure 600 according to another embodiment of the present disclosure. In the embodiment of FIGS. 6A to 6C, the planar transparent antenna structure 600 includes two dielectric substrates SB61 and SB62, a radiation patch conductive layer AT6, a parasitic patch conductive layer PR6, a ground conductive layer GD6 and a feeder FD6. As shown in FIG. 6C, the thickness of the dielectric substrate SB61 and the thickness of the dielectric substrate SB62 are, for example, substantially identical. The material of the dielectric substrate SB61 and the material of the dielectric substrate SB62 are, for example, identical. For example, they could be glass or a non-conductive high-transparency material.

As shown in FIG. 6C, the ground conductive layer GD6 is disposed between the dielectric substrate SB61 and the dielectric substrate SB62. The ground conductive layer GD6 is disposed on a first surface S61 of the dielectric substrate SB62. The feeder FD6 is disposed on a second surface S62 of the dielectric substrate SB62.

As shown in FIGS. 6A to 6C, the ground conductive layer GD6 has an aperture GD6S. The extension direction of the aperture GD6S is substantially perpendicular to the extension direction of the feeder FD6. The aperture GD6S covers the overlapping range of the radiation patch conductive layer AT6 and the feeder FD6, the feeder FD6 partially overlaps with the radiation patch conductive layer AT6 in the aperture GD6S.

Figure 7A:
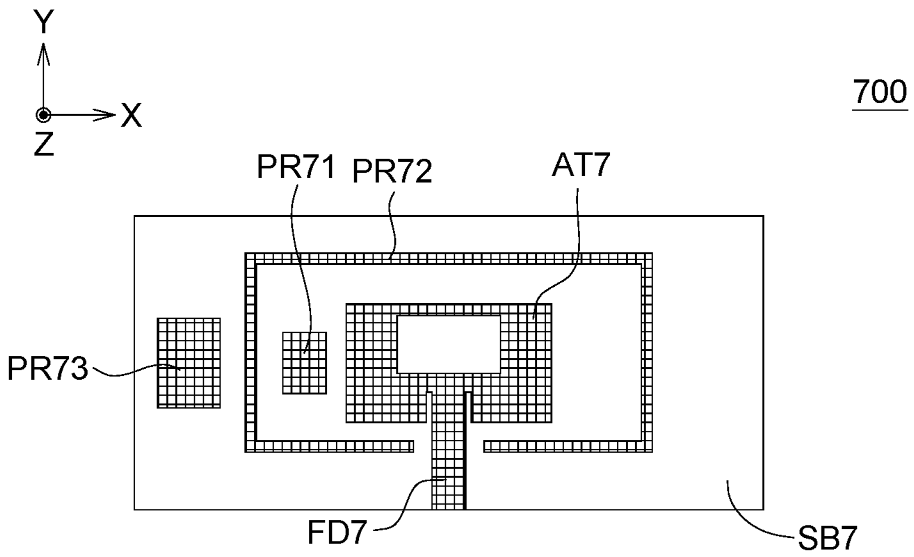
FIG. 7A illustrates a top view of a planar transparent antenna structure according to another embodiment of the present disclosure.
Figure 7B:
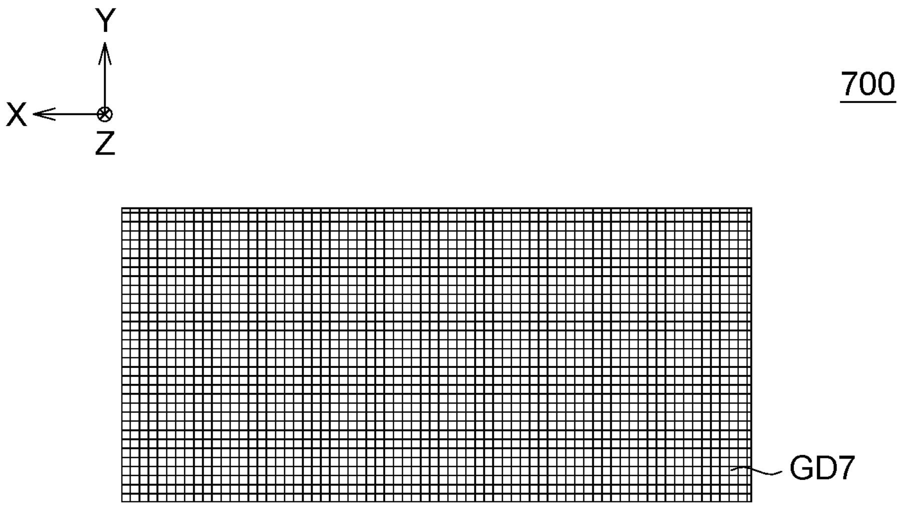
FIG. 7B illustrates a rear view of the planar transparent antenna structure according to another embodiment of the present disclosure.
Figure 7C:
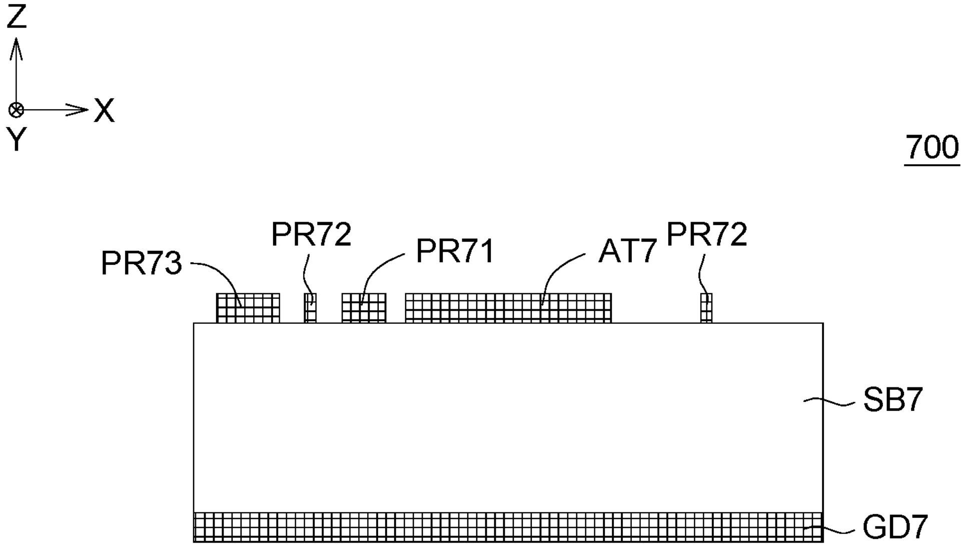
FIG. 7C illustrates a side view of the planar transparent antenna structure according to another embodiment of the present disclosure.

Please refer to FIGS. 7A to 7C. FIG. 7A illustrates a top view of a planar transparent antenna structure 700 according to another embodiment of the present disclosure. FIG. 7B illustrates a rear view of the planar transparent antenna structure 700 according to another embodiment of the present disclosure. FIG. 7C illustrates a side view of the planar transparent antenna structure 700 according to another embodiment of the present disclosure. In this embodiment, the planar transparent antenna structure 700 includes a dielectric substrate SB7, a radiation patch conductive layer AT7, at least two parasitic patch conductive layers PR71, PR73, a parasitic ring conductive layer PR72, a ground conductive layer GD7 and a feeder FD7. As shown in FIG. 7A, the area of the parasitic patch conductive layer PR73 is larger than the area of the parasitic patch conductive layer PR71.

As shown in FIG. 7A, the parasitic patch conductive layers PR71, PR73 and the parasitic ring conductive layer PR72 are composed of the wires LNi interleaved and connected with each other. The parasitic ring conductive layer PR72 substantially surrounds the parasitic patch conductive layer PR71 and the radiation patch conductive layer AT7, and is not connected to each other and completely isolated. The parasitic patch conductive layer PR73 is disposed at the outside of the parasitic ring conductive layer PR72. The parasitic ring conductive layer PR72, the parasitic patch conductive layers PR71, PR73 and the radiation patch conductive layer AT7 are not connected to each other and are completely isolated. The parasitic patch conductive layer PR71 and the parasitic patch conductive layer PR73 could be disposed at the left or right side of the radiation patch conductive layer AT7 or other locations other than the location of the feeder FD7 according to the user's needs.

Figure 8:
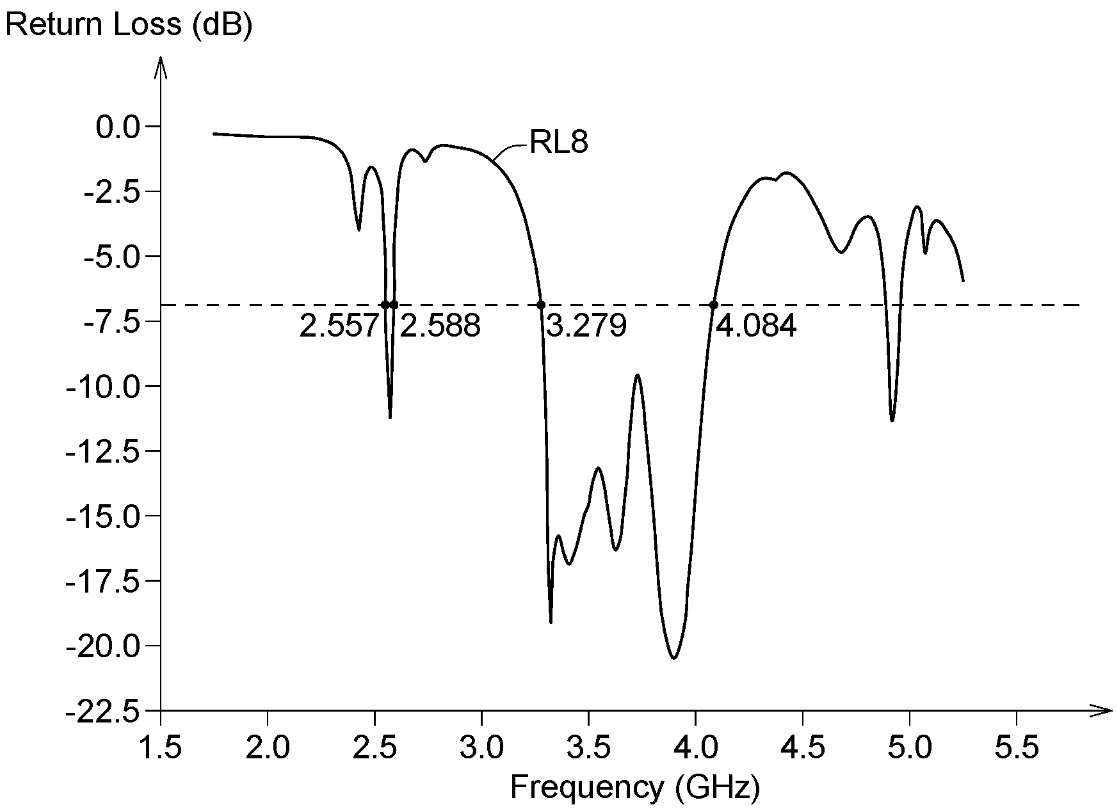
FIG. 8 illustrates a return loss curve of the planar transparent antenna structure in FIGS. 7A to 7C.

Please refer to FIG. 8, which illustrates a return loss curve RL8 of the planar transparent antenna structure 700 in FIGS. 7A to 7C. In FIG. 8, the horizontal axis is the frequency and the vertical axis is the return loss. As shown in the return loss curve RL8, the planar transparent antenna structure 700 with the parasitic patch conductive layers PR71, PR73, the parasitic ring conductive layer PR72 and the ring structure radiation patch conductive layer AT7 radiates at the frequencies of 2.557 GHz to 2.588 GHz, 3.279 GHz to 4.084 GHz. In this embodiment, the planar transparent antenna structure 700 could significantly obtain a wider bandwidth.

Figure 9A:
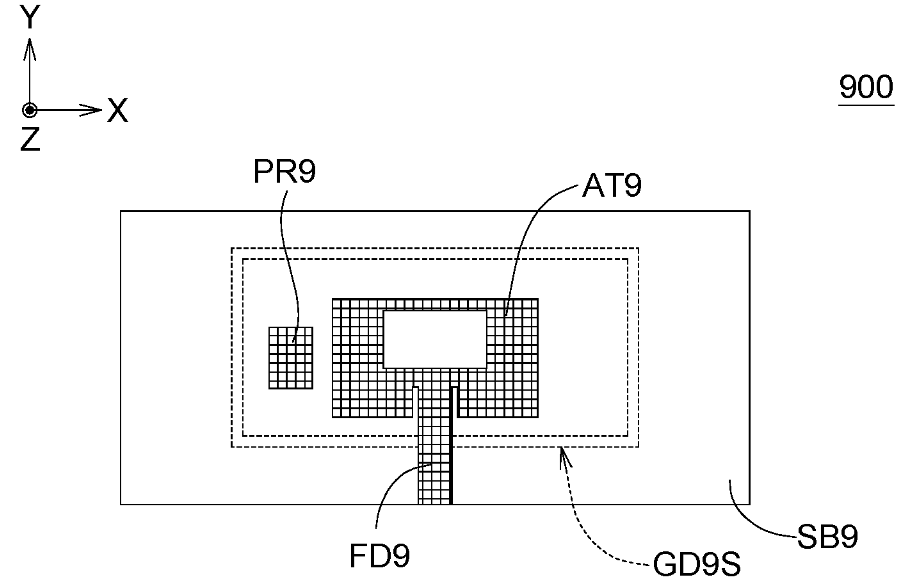
FIG. 9A illustrates a top view of a planar transparent antenna structure according to another embodiment of the present disclosure.
Figure 9B:
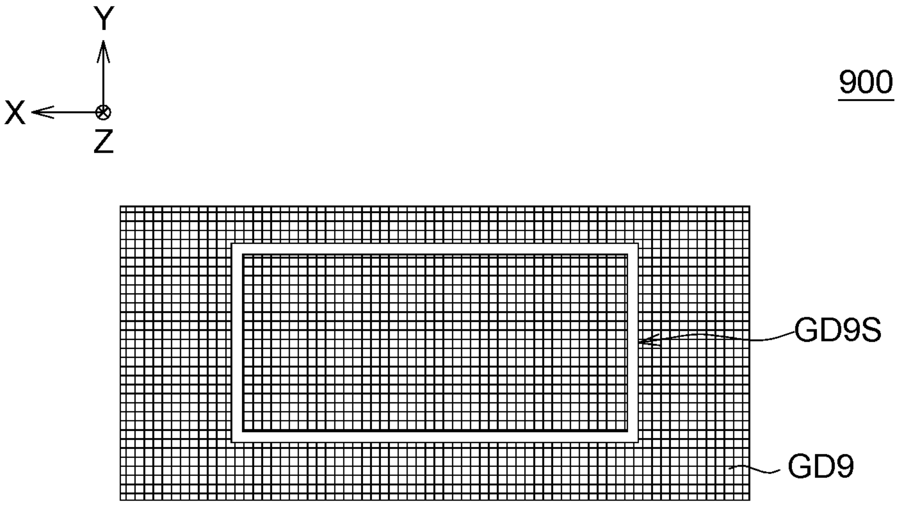
FIG. 9B illustrates a rear view of the planar transparent antenna structure according to another embodiment of the present disclosure.
Figure 9C:
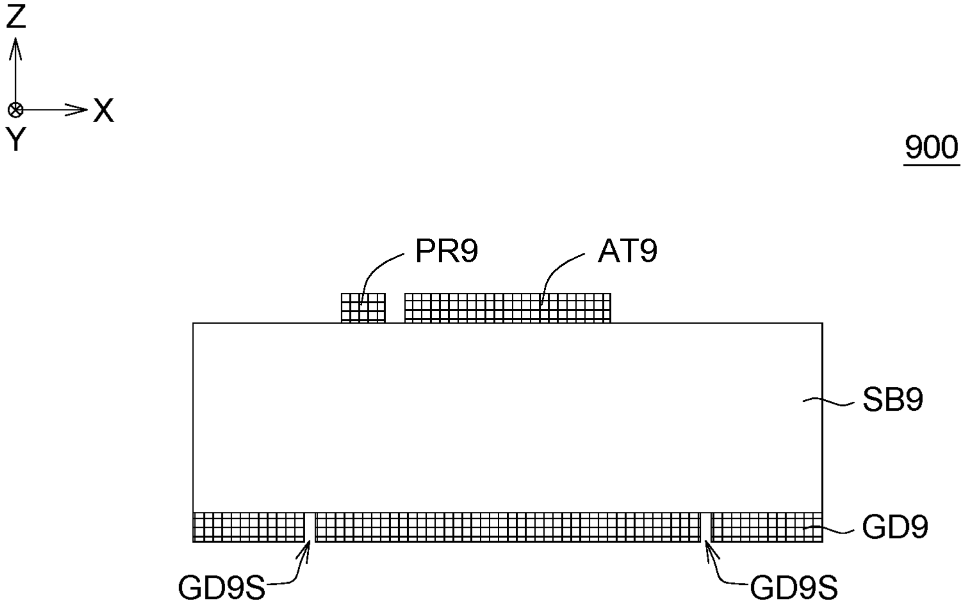
FIG. 9C illustrates a side view of the planar transparent antenna structure according to another embodiment of the present disclosure.

Please refer to FIGS. 9A to 9C. FIG. 9A illustrates a top view of a planar transparent antenna structure 900 according to another embodiment of the present disclosure. FIG. 9B illustrates a rear view of the planar transparent antenna structure 900 according to another embodiment of the present disclosure. FIG. 9C illustrates a side view of the planar transparent antenna structure 900 according to another embodiment of the present disclosure. The planar transparent antenna structure 900 includes a dielectric substrate SB9, a radiation patch conductive layer AT9, a parasitic patch conductive layer PR9, a ground conductive layer GD9 and a feeder FD9.

As shown in FIG. 9B, the ground conductive layer GD9 could have a ring slot GD9S. The ring slot GD9S is a closed ring structure, such as a rectangle, a circle, or a square. As shown in FIG. 9A, the ring slot GD9S surrounds the radiation patch conductive layer AT9 and the parasitic patch conductive layer PR9.

Figure 10:
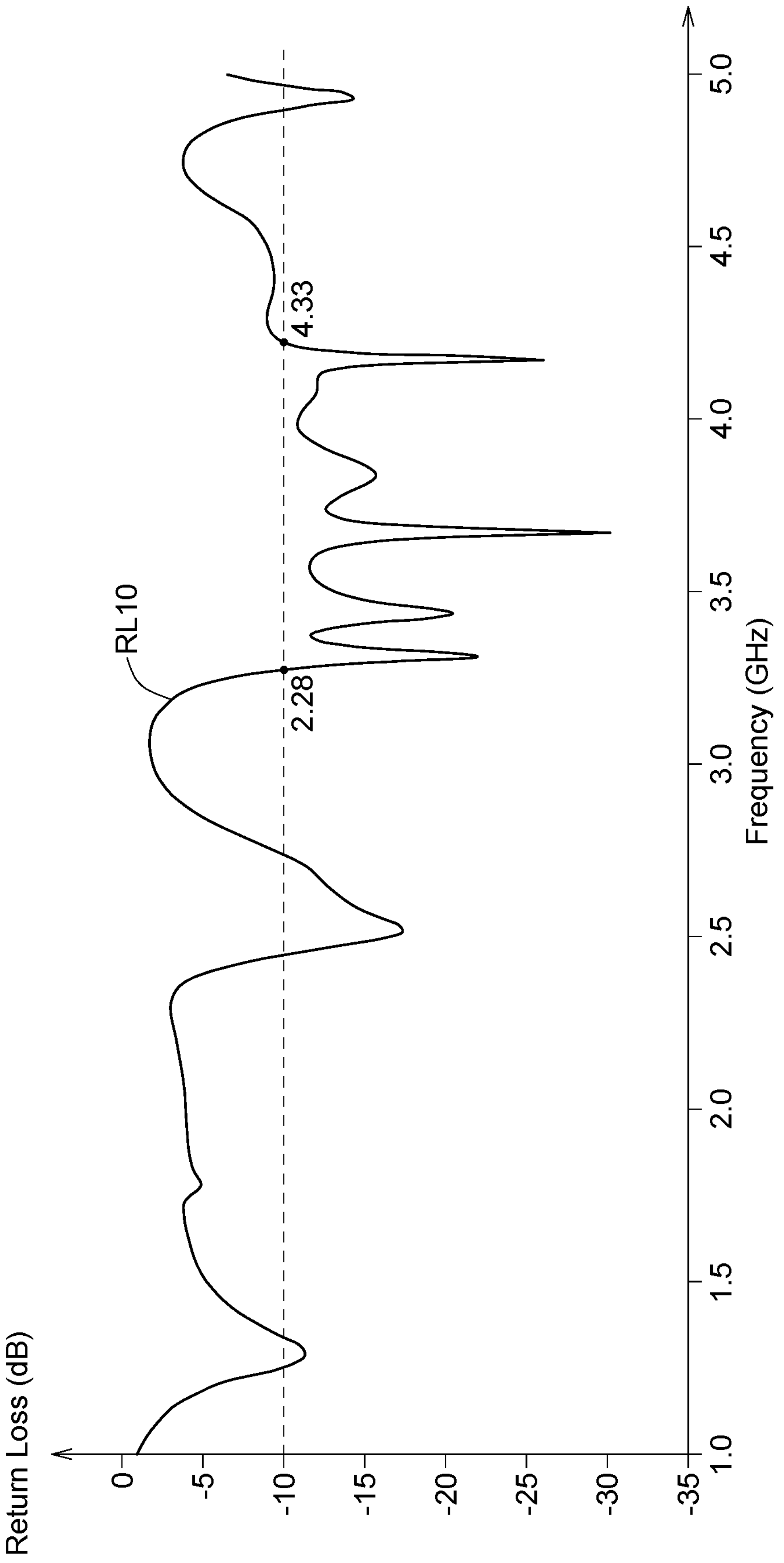
FIG. 10 illustrates a return loss curve of the planar transparent antenna structure in FIGS. 9A to 9C.

Please refer to FIG. 10, which illustrates a return loss curve RL10 of the planar transparent antenna structure 900 in FIGS. 9A to 9C. In FIG. 10, the horizontal axis is the frequency and the vertical axis is the return loss. As shown in the return loss curve RL10, the planar transparent antenna structure 900 with the ground conductive layer GD9 having the ring slot GD9S could radiate at the frequency of 2.28 GHz to 4.33 GHz. In this embodiment, the bandwidth of the planar transparent antenna structure 900 with the ring slot GD9S is significantly increased.

Figure 11A:
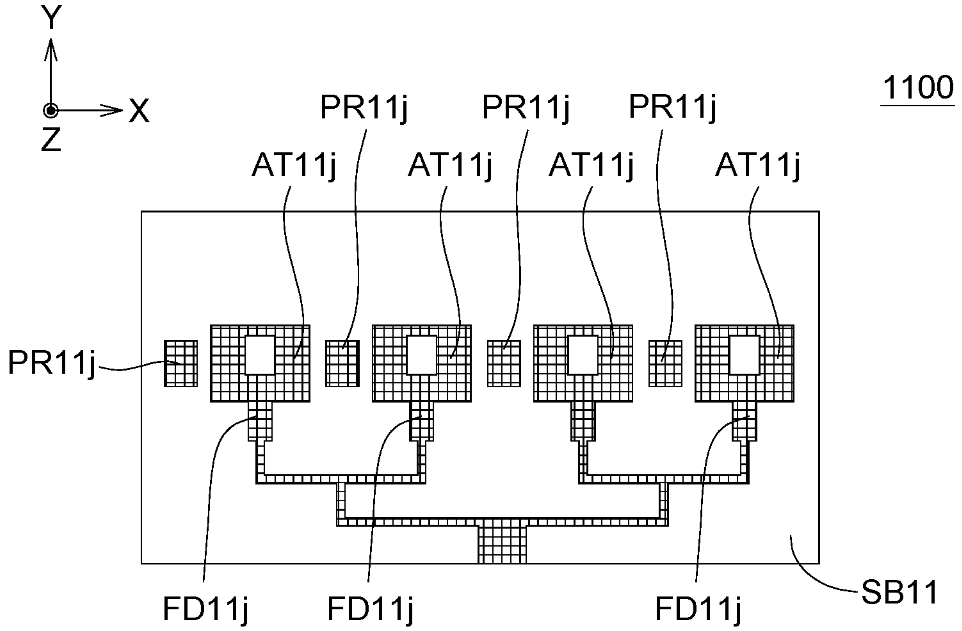
FIG. 11A illustrates a top view of a planar transparent antenna structure according to another embodiment of the disclosure.
Figure 11B:
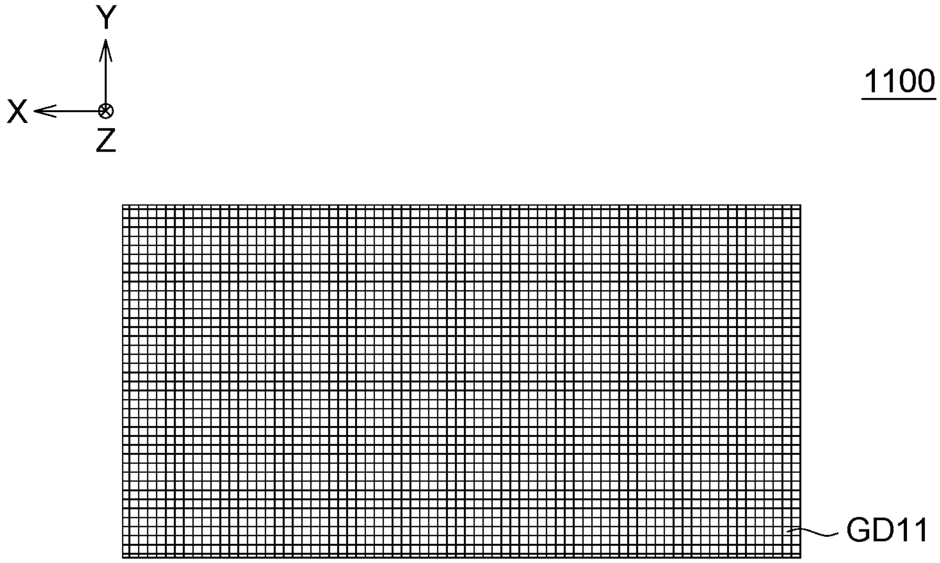
FIG. 11B illustrates a rear view of the planar transparent antenna structure according to another embodiment of the disclosure.
Figure 11C:
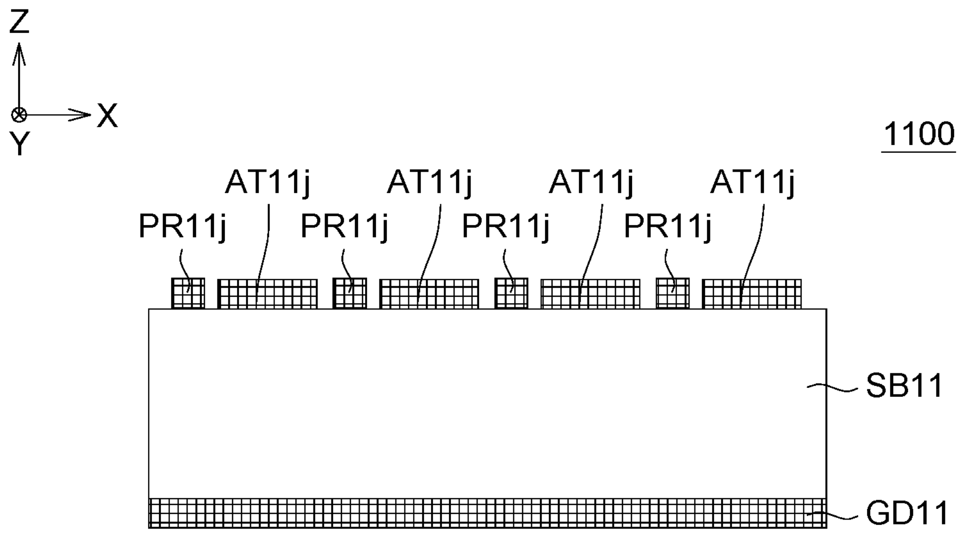
FIG. 11C illustrates a side view of the planar transparent antenna structure according to another embodiment of the present disclosure.

Please refer to FIGS. 11A to 11C. FIG. 11A illustrates a top view of a planar transparent antenna structure 1100 according to another embodiment of the disclosure. FIG. 11B illustrates a rear view of the planar transparent antenna structure 1100 according to another embodiment of the disclosure. FIG. 11C illustrates a side view of the planar transparent antenna structure 1100 according to another embodiment of the present disclosure. The planar transparent antenna structure 1100 includes a dielectric substrate SB11, at least one radiation patch conductive layer AT11*j*, at least one parasitic patch conductive layer PR11*j*, a ground conductive layer GD11 and at least one feeder FD11*j*.

As shown in FIG. 11A, each of the radiation patch conductive layer AT11*j* is connected to one of the feeders FD11*j*. The parasitic patch conductive layer PR11*j* could be disposed at one side of the radiation patch conductive layer AT11*j*, for example, the left side, the right side or the lower side of the radiation patch conductive layer AT11*j*.

As shown in the FIG. 11A, the plurality of radiation patch conductive layers AT11*j*, the plurality of parasitic patch conductive layers PR11*j* and the plurality of feeders FD11*j* could expand the bandwidth of planar transparent antenna structure 1100.

In the above various embodiments, the shape of the mesh is not limited to a square, but could also be a rectangle, a circle, a triangle, a hexagon, or any other shape.

According to the above embodiment, the conductive layer is formed through the mesh-like wires, a parasitic patch conductive layer is added, and the radiation patch conductive layer is designed into a ring structure, so that the planar transparent antenna structure could exhibit a certain degree of transparency, and could have good radiation efficiency.

It will be apparent to those skilled in the art that various modifications and variations can be made to the disclosed embodiments. It is intended that the specification and examples be considered as exemplars only, with a true scope of the disclosure being indicated by the following claims and their equivalents.

What is claimed is:

1. A planar transparent antenna structure, comprising:

a dielectric substrate;

a radiation patch conductive layer, disposed on the dielectric substrate, wherein the radiation patch conductive layer is a ring structure, the radiation patch conductive layer has a slot and a metal body, and shape of the slot is rectangular, triangular or trapezoidal;

a parasitic patch conductive layer, disposed on the dielectric substrate;

a ground conductive layer, disposed on the dielectric substrate;

a parasitic ring conductive layer, surrounding the parasitic patch conductive layer and the radiation patch conductive layer; and another parasitic patch conductive layer, disposed at outside of the parasitic ring conductive layer;

wherein the radiation patch conductive layer, the parasitic patch conductive layer and the ground conductive layer are composed of a plurality of wires interlaced and connected with each other and are light-transmissive.

2. The planar transparent antenna structure according to claim 1, wherein the radiation patch conductive layer and the parasitic patch conductive layer are disposed on same surface of the dielectric substrate.

3. The planar transparent antenna structure according to claim 1, wherein the parasitic patch conductive layer is completely isolated from the radiation patch conductive layer.

4. The planar transparent antenna structure according to claim 1, further comprising:

a feeder, wherein the feeder is composed of the wires interlaced and connected with each other, an edge of the radiation patch conductive layer is rectangular, and the feeder and the parasitic patch conductive layer are arranged at outside of two adjacent sides of the radiation patch conductive layer.

5. The planar transparent antenna structure according to claim 1, wherein the parasitic ring conductive layer and the parasitic patch conductive layers are composed of the wires interleaved and connected with each other.

6. The planar transparent antenna structure according to claim 5, wherein the parasitic patch conductive layers have different areas.

7. The planar transparent antenna structure according to claim 5, wherein the parasitic ring conductive layer is completely isolated from the radiation patch conductive layer.

8. The planar transparent antenna structure according to claim 5, wherein the parasitic patch conductive layers are completely isolated from the radiation patch conductive layer.

9. A planar transparent antenna structure, comprising:

a dielectric substrate;

a radiation patch conductive layer, disposed on the dielectric substrate, wherein the radiation patch conductive layer has a slot and a metal body, and the slot is 0.3 times or more of the metal body;

only one parasitic patch conductive layer, disposed on the dielectric substrate;

a ground conductive layer, disposed on the dielectric substrate; and a feeder, wherein an edge of the radiation patch conductive layer is rectangular, the feeder and the only one parasitic patch conductive layer are respectively arranged at a first side and a second side of the radiation patch conductive layer, the first side and the second side are opposite, and the radiation patch conductive layer has an opening which is closer to the second side than to the first side;

wherein the radiation patch conductive layer, the only one parasitic patch conductive layer and the ground conductive layer are composed of a plurality of wires interlaced and connected with each other and are light-transmissive.

10. The planar transparent antenna structure according to claim 9, wherein the slot is rectangular, circular, triangular or trapezoidal.

11. A planar transparent antenna structure, comprising:

a dielectric substrate;

a radiation patch conductive layer, disposed on the dielectric substrate, wherein the radiation patch conductive layer is a ring structure;

a parasitic patch conductive layer, disposed on the dielectric substrate; and a ground conductive layer, disposed on the dielectric substrate, wherein a closed ring slot is disposed in the ground conductive layer, and an inner annular side of the closed ring slot and an outer annular side of the closed ring slot fully contact the ground conductive layer;

wherein the radiation patch conductive layer, the parasitic patch conductive layer and the ground conductive layer have a plurality of holes and are light-transmissive, and the holes are arranged in an array.

* * * * *